W. A. J. HODO.
PROCESS OF GINNING, CLEANING, AND BLEACHING COTTON.
APPLICATION FILED MAR. 27, 1917.
1,230,298.
Patented June 19, 1917.
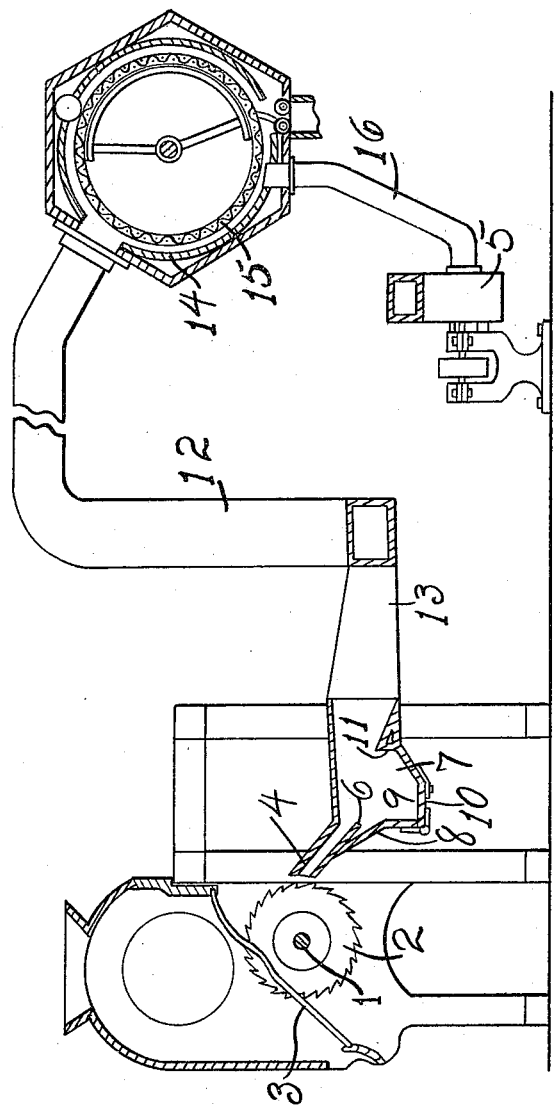
WESLEY A. J. HODO. Inventor
By A. L. Jackson
Attorney

UNITED STATES PATENT OFFICE.

WESLEY A. J. HODO, OF CLEBURNE, TEXAS, ASSIGNOR OF ONE-HALF TO B. D. CRAMER, OF FORT WORTH, TEXAS.

PROCESS OF GINNING, CLEANING, AND BLEACHING COTTON.

1,230,298.  Specification of Letters Patent.  Patented June 19, 1917.

Application filed March 27, 1917. Serial No. 157,646.

*To all whom it may concern:*

Be it known that I, WESLEY A. J. HODO, a citizen of the United States, residing at Cleburne, in the county of Johnson and State of Texas, have invented certain new and useful Improvement in Processes of Ginning, Cleaning, and Bleaching Cotton, of which the following is a specification.

My invention relates to cotton ginning and more particularly to stripping the lint cotton from the seed and for treating cotton with an air treatment after it leaves the saws; and the object is to provide a process of ginning cotton and a positive and highly efficient process of cleaning and bleaching cotton after it leaves the saw teeth and before it is condensed. It is well known that oxygen is the active agent in various liquid bleaching processes and, as the greater part of air is oxygen, advantage is taken of the large percentage of oxygen in air for treating the lint cotton in the loose and fluffy state with air before the cotton is condensed. It is well known that seed cotton is often dark or stained from exposure to rain which beats the cotton to the ground and also stains the cotton through water-soaked bolls which rot and through the leaves of the stalks. Much seed cotton is stained from the bolls, caused by frost on the bolls before the bolls open. The advantage of the improved process is that the cotton is cleaned of dirt and dust and trash and shale and the cotton is apparently bleached because the dark and yellow stains seem to be removed from the lint cotton. The advantage to the farmer is that the grade of the cotton is much improved and brings a higher price. Another advantage discovered in the actual service of ginning the cotton is that the output or amount of lint cotton obtained from the seed cotton is increased as compared with other ginning systems. The process hereinafter claimed is set forth in the patent granted to me on November 7, 1916, No. 1,203,739, for cotton ginning, cleaning, and bleaching mechanism. Other objects and advantages will be fully explained in the following description and the invention will be more particularly pointed out in the claims.

Reference is had to the accompanying drawing which forms a part of this application.

The drawing is merely diagrammatic and partly in section to illustrate the point of treating the cotton with the air after it leaves the saw teeth. A part of a gin stand is shown in the drawing in which is mounted the usual shaft 1 on which is mounted a gang of saws 2, of the usual construction, with ribs 3. The mechanical devices for carrying out the improved process include a nozzle 4 which terminates in close proximity to the saw teeth. A suction fan 5 is connected to the nozzle 4 by means of a flue 12 and branch flues 13 which carry the cotton through a condenser 14 which is provided with a revolving screen drum 15 and flue 16 which connects with the fan 5. It will be understood that the nozzle 4 extends the entire width of the gang of saws and that the cleaning chamber 7 is co-extensive in width with the gang of saws. The lower wall of the nozzle 4 is provided with a projection 6 for producing a partial vacuum or dead air space across the entire nozzle substantially at the point 8. The enlarged space in the chamber 7 causes an eddying of the draft of air as it leaves the nozzle and this eddying is cyclonic in effect producing a whirling motion of the draft and lint cotton transversely of the path of the cotton which has been stripped from the saw teeth. In the lower part of the chamber 7, substantially about the space 9, there will be a dead air space in which the dust and dirt and shale and trash will fall on the bottom 10 for removal. For the purpose of making this operation highly efficient for the purposes set forth, a wind break or baffle 11 is placed cross-wise the chamber 7 and attached thereto near the exit thereof.

The treating of the cotton with air necessarily commences with the stripping action of the air, taking the cotton from the saw teeth which takes the cotton off almost fiber by fiber. This action differs from stripping the cotton with a blast of air because the blast would tend to pack the fibers together whereas a suction draft tends to separate the fibers so that they can be treated individually by the air and the same action will also separate the fiber from the trash or foreign matter in the cotton. The fibers are then treated with air by being delayed and revolved in the chamber 7. The force of the suction draft will extend only a short distance on the saws and thus aid in the operation of moting, separating the cotton fibers from the motes and heavier trash at the same time that the cotton is stripped from the saw teeth. The retarding of the cotton in the chamber 7 aids in exposing the cotton to the air and consequently to the oxygen which is in the air. This operation has been demonstrated to be highly efficient in cleaning and purifying and apparently bleaching the cotton as the black and yellow stains are removed from the cotton.

What I claim is:—

1. In a ginning operation, a process of removing the cotton from the gin saw teeth by means of a suction draft of air moving first from the gin saw teeth in a straight line, then in a whirling body of air, and then in a straight line.

2. A process of ginning and cleaning cotton which consists of stripping the lint cotton from the ginning elements by means of suction, treating the cotton so stripped to a whirling body of air in a chamber closed except to the action of the suction and thereafter removing the cotton from said chamber by said suction.

3. A process of treating lint cotton which consists of removing lint cotton from the ginning elements by means of suction, subjecting the cotton so removed to a whirling body of air in a chamber closed except to the action of the suction, and thereafter removing the cotton from said chamber by said suction.

4. A process of cleaning ginned cotton which consists of removing the cotton from the ginning elements by means of suction, treating the cotton so removed to a whirling body of air in a chamber closed except to the action of the suction and thereafter removing the cotton from said chamber by said suction.

5. In a ginning operation, a process of treating the cotton which consists of separating the cotton from the saw teeth by means of suction, subjecting the cotton so separated to a whirling body of air in a chamber closed except to the action of the suction, and thereafter removing the cotton from said chamber by said suction.

In testimony whereof, I set my hand, this 8th day of November, 1916.

WESLEY A. J. HODO.

Copies of this patent may be obtained for five cents each, by addressing the "Commissioner of Patents, Washington, D. C."